(12) United States Patent
Androncik et al.

(10) Patent No.: US 9,286,046 B2
(45) Date of Patent: Mar. 15, 2016

(54) METHOD AND APPARATUS FOR DISTRIBUTED OPERATING SYSTEM IMAGE DEPLOYMENT

(75) Inventors: Alexander Androncik, Richmond Hill (CA); Christopher Lefterys, Newmarket (CA); Nikhil Tull, Austin, TX (US); Sonemaly Phrasavath, Austin, TX (US)

(73) Assignees: Advanced Micro Devices, Inc., Sunnyvale, CA (US); ATI Technologies ULC, Markham (CA)

( * ) Notice: Subject to any disclaimer, the term of this patent is extended or adjusted under 35 U.S.C. 154(b) by 944 days.

(21) Appl. No.: 13/333,579

(22) Filed: Dec. 21, 2011

(65) Prior Publication Data

US 2013/0167140 A1    Jun. 27, 2013

(51) Int. Cl.
    *G06F 9/44*     (2006.01)
    *G06F 9/445*    (2006.01)

(52) U.S. Cl.
    CPC ........................ *G06F 8/61* (2013.01)

(58) Field of Classification Search
    USPC ........................................................ 717/175
    See application file for complete search history.

(56) References Cited

U.S. PATENT DOCUMENTS

| | | | | |
|---|---|---|---|---|
| 7,668,938 B1 * | 2/2010 | Phillips et al. | ................. | 709/220 |
| 7,822,963 B2 * | 10/2010 | Willems | ............................ | 713/2 |
| 8,234,359 B2 * | 7/2012 | Bestmann | ................. | G06F 8/63 |
| | | | | 709/215 |
| 8,595,714 B1 * | 11/2013 | Hamer | ........................... | 717/170 |
| 9,081,639 B2 * | 7/2015 | Bestmann | ................. | G06F 8/63 |
| 2004/0153733 A1 * | 8/2004 | Lin | .................... | 714/6 |
| 2006/0230395 A1 * | 10/2006 | Paul et al. | ..................... | 717/173 |
| 2006/0294515 A1 * | 12/2006 | Gimpl et al. | .................. | 717/174 |
| 2007/0140242 A1 * | 6/2007 | DiGiorgio et al. | ............ | 370/390 |
| 2008/0010639 A1 * | 1/2008 | Bestmann | ................. | G06F 8/63 |
| | | | | 718/100 |
| 2008/0155302 A1 * | 6/2008 | Mue | .................... | G06F 11/1469 |
| | | | | 714/2 |
| 2009/0307477 A1 * | 12/2009 | Matthew et al. | .................. | 713/2 |
| 2010/0161978 A1 * | 6/2010 | Bacher | ........................... | 713/166 |
| 2011/0055629 A1 * | 3/2011 | Lee et al. | ........................ | 714/15 |
| 2012/0047499 A1 * | 2/2012 | Krzystofczyk | ........... | G06F 8/63 |
| | | | | 717/174 |
| 2012/0054734 A1 * | 3/2012 | Andrews et al. | .............. | 717/171 |
| 2012/0185841 A1 * | 7/2012 | Lee et al. | ...................... | 717/171 |
| 2013/0167140 A1 * | 6/2013 | Androncik | ................ | G06F 8/61 |
| | | | | 717/175 |

* cited by examiner

*Primary Examiner* — Marina Lee
(74) *Attorney, Agent, or Firm* — Faegre Baker Daniels LLP (57) ABSTRACT

A method and apparatus provides for controlling the distribution and installation of operating systems. In one example, the method and apparatus partitions a storage device of a device into a first partition and a second partition. The method and apparatus installs a first operating system into the first partition of the storage device, obtains an image of the second operating system, the image including at least the second operating system pre-configured for operation with the device, and installs, using the first operating system, the image of the operating system to the second partition of the storage device. In an embodiment, the image is transmitted from one or more other devices. In an embodiment, two or more images are cached on the device according to the likelihood they will be used in the future.

28 Claims, 9 Drawing Sheets

METHOD AND APPARATUS FOR DISTRIBUTED OPERATING SYSTEM IMAGE DEPLOYMENT

BACKGROUND OF THE DISCLOSURE

The disclosure relates generally to a method and apparatus for distributing operating systems or other electronic files.

As efforts to validate hardware and/or software rely increasingly on automation, the need to effectively run large distributed test farms is highlighted as an ingredient to achieve desired coverage and reduce time to market. A large test farm may include a plurality of devices that allow for testing. Operating system deployment is important to enable a large test farm, as the devices must be running similar versions of operating systems and include similar files to allow for comparisons between devices under test. In many cases, this process is manual. Operating systems are pre-deployed and utilized throughout the life of the test farm— that is, an operating system is installed on a device under test, and is kept on the device under test for many validation activities. However, this approach is not the most effective since it is difficult to change the OS distribution of the test farm for various types of platform validation. In the manual process, a user must manually install a new or replacement operating system at each of the devices under test, in many cases, physically interacting with the device to install the operating system. Further, the utilization of a single operating system installation for a device under test breaks down if validation or other activities modify the operating system or corrupt the operating system.

Accordingly, there exists a need for improved method and apparatus for deploying operating system images or other files to a plurality of devices.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, in one example, a method for distributing an operating system is provided. The method includes partitioning a storage device of a device into a first partition and a second partition. The method also installs a first operating system into the first partition of the storage device. The method also obtains an image of a second operating system, the image including at least a second operating system pre-configured for operation with the device. The method also installs, using the first operating system, the image of the second operating system to the second partition of the storage device.

In another example, a method for data distribution is provided. The method receives instructions from an end user device, the instructions identifying one or more devices and at least one image. The method also transmits at least one of the at least one image or information regarding the location of the at least one image to the one or more devices to receive the at least one image. In response to the transmission of the image or information regarding the location of the image, the method receives data from the one or more devices, indicating that the at least one image is operational.

In another example, a method for data distribution is provided. The method includes operating a device, the device including at least a storage device capable of being partitioned, the storage device including a second partition with a second operating system, and a first partition with a first operating system. The method also includes receiving instructions to operate the first operating system from a central repository of images connected to the device with one or more networks. The method also includes changing the active partition to the first partition, and rebooting the device to operate with the first operating system in response to receiving instructions to operate the first operating system from the central repository of images. The method also includes receiving instructions from the central repository of images to receive a third operating system. The method also includes receiving an image, the image including at least one or more files to execute the third operating system. The method also includes removing the second operating system from the second partition. The method also includes installing the third operating system on the second partition and changing the active partition to the second partition, and rebooting the device to operate with the third operating system.

In another example, an apparatus for distributing an operating system is provided. The system includes logic operable to partition a storage device of a device into a first partition and a second partition. The logic is also operable to install a first operating system into the first partition of the storage device. The logic is also operable to obtain an image of the second operating system, the image including at least a second operating system pre-configured for operation with the device. The logic is also operable to install, using the first operating system, the image of the second operating system to the second partition of the storage device.

In another example, a computer readable storage medium is provided comprising executable instructions that when executed by one or more processors, causes the one or more processors to partition a storage device of a device into a first partition and a second partition. The executable instructions also cause the processors to install a first operating system into the first partition of the storage device. The executable instructions also cause the processors to obtain an image of the second operating system, the image including at least a second operating system pre-configured for operation with the device. The executable instructions also cause the processors to install, using the first operating system, the image of the second operating system to the second partition of the storage device.

Among other advantages, the present disclosure may allow the distribution of operating system images and/or other electronic files to computer systems that are in communication with a network. The operating system images may be transmitted to one or more devices, and the one or more devices may use the operating system images to recreate an installation of an operating system on a device. The operating system may be transmitted and/or installed on the device without direction interaction by a user. Accordingly, the proposed techniques can improve user control of devices by providing a more intuitive and user-friendly way to deploy and install operating system images to a plurality of devices. Other advantages will be recognized by those of ordinary skill in the art.

Figure 1:
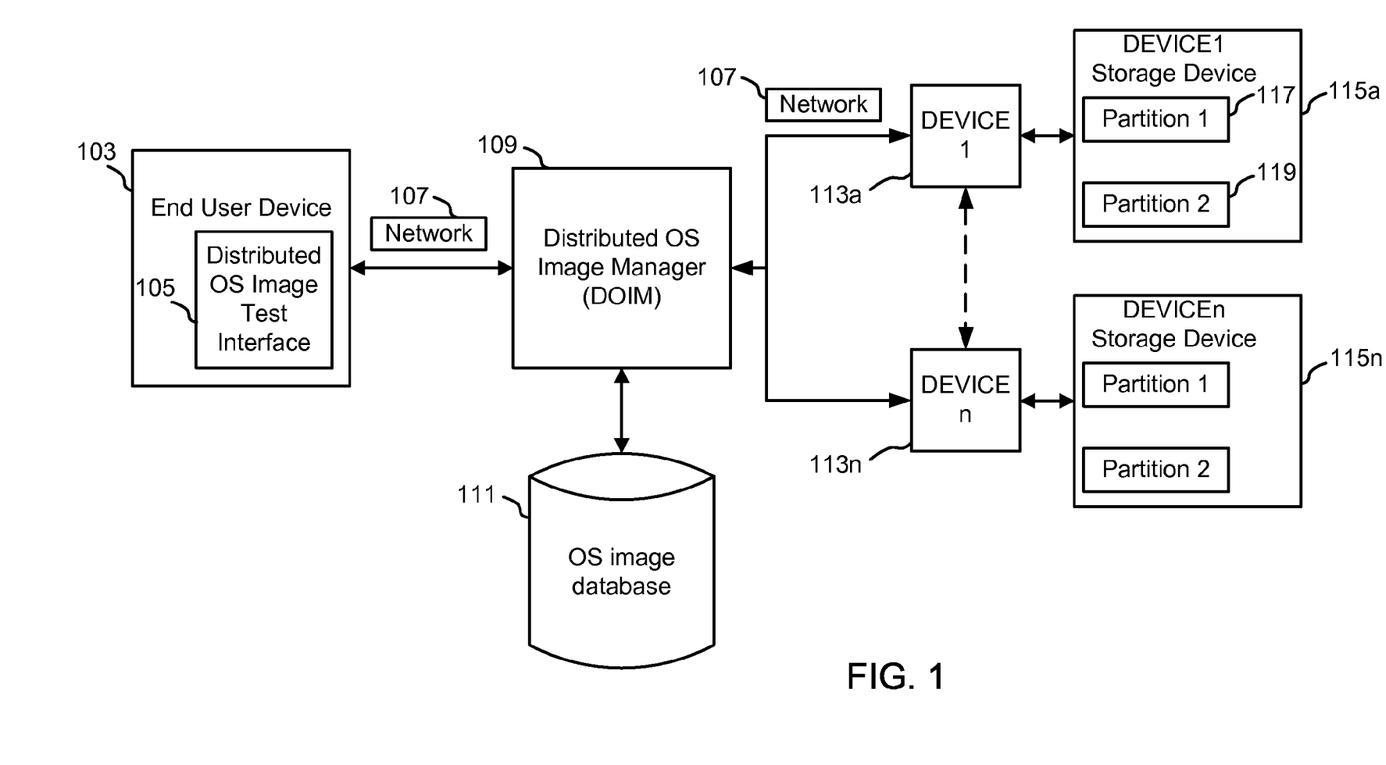
FIG. 1 is a block diagram illustrating one example of a system for deploying operating systems according to an embodiment of the present disclosure.

FIG. 1 illustrates one example of a system for deploying operating systems according to an embodiment of the present disclosure. The distributed operating system image manager 109 (DOIM) receives commands from the distributed OS image test interface 105 of an end user device 103, and transmits commands, one or more operating system images, or other signals to the one or more devices 113a-113n. The DOIM 109, the end user device 103, and the one or more devices 113a-113n are in communication via one or more networks.

The DOIM 109, in the embodiment, is a computer system including logic, such as logic that includes one or more processors, suitable memory, suitable communication interfaces as known in the art, and one or more input and output devices as known in the art, that is in communication with one or more end user devices 103 and one or more devices 113a-113n. The DOIM 109 receives commands from the end user device 103, and transmits or facilitates the transmission of operating system images to one or more of the devices 113a-113n. The DOIM 109 is in communication with the end user device 103, the OS image database 111, and the devices 113a-113n via one or more networks or other communication mediums, such as, for example and without limitation, one or more direct connections. While a single DOIM 109 system is shown in FIG. 1, multiple DOIM 109 systems may be present in a network 107. Multiple DOIM 109 systems may be available to the end user devices 103, or may be associated with the devices 113a-113n. The DOIM 109 may include one or more modules operable to receive input, generate output, and execute tasks related to the input. A module, in the example, is a processor or a portion of a processor executing instructions to cause the processor to perform one or more functions. The DOIM 109 may be implemented by logic. Logic is, in this example, in the form of one or more processors executing executable instructions that cause the logic to operate as described herein. However, it will also be recognized that the logic may be implemented if desired as discrete logic such as but not limited to: one or more state machines, digital signal processors, or any other suitable hardware or any suitable combination of hardware and software. The DOIM 109 may, in an embodiment, include one or more images, so that the DOIM is a central repository for images on a network. The DOIM 109 may be connected or associated with the devices 113a-113n via one or more networks.

As used herein, an "operating system image" or "image" is one or more electronic files. The image includes files that are necessary and/or desirable to install one or more operating systems on a device 113a. The image, in an embodiment, is compressed using one or more file compression algorithms to decrease transmission time. The image may also be uncompressed. The image may be encrypted or unencrypted. The image may include a single file, and the one or more files for the operating system may be included in the single image file, and later extracted and/or decompressed from the single image file. In an embodiment, the image includes the files necessary or desirable to operate the operating system, and additional files are included or existing files are modified to allow the operating system to operate on one or more particular devices. For example, the image may include driver software specific to the device that it is installed upon, or may include one or more additional configuration files with settings or options specific to the device it is installed upon. A pre-configured image may be installed on a device, and the operating system and configuration files may allow the device to be operational without further modification by a user or administrator. In an embodiment, the image file may comprise two or more files, and the one or more files for the operating system may be extracted and/or decompressed from the two or more files. In another embodiment, the image may be the list of files to be included for the operating system, and the location of the files. Additionally, one or more additional electronic files may be present in the image. The image may include, for example and without limitation, executable programs that may execute with the operating system, data files used by the operating system and/or the other executable programs, or other files. For example and without limitation, the image may include an executor. Data files associated with the operating system may allow the executor to load upon the execution of the operating system.

The OS image database 111, in an embodiment, is a relational database or other database that organizes one or more images. The OS image database 111, in an embodiment, resides on a system apart from the DOIM 109, and may communicate with the DOIM 109 and/or the devices 113a-113n via a network 107 or other communication medium. The OS image database 111, in another embodiment, resides on the DOIM 109. The OS image database 111 may include the images, or the OS image database 111 may include the location of the images that are stored within the OS image database 111, or are stored on a storage area or other system that is accessible by the OS image database 111, the DOIM 109, and/or the devices 113a-113n.

The end user device 103 is a computer system or other system that includes software and/or hardware that allows a user to transmit commands to the DOIM 109. In an embodiment, the end user device 103 is a computer, such as, for example and without limitation, a desktop computer, a laptop computer, a tablet computer, or a handheld computer. The end user device 103 may, in an embodiment, be a smartphone. The end user device 103 may receive input from a user or another system.

In this example, the distributed OS image test interface 105 is a processor executing software that operates on the end user device 103 that allows the user to make selections regarding the operating system images and the devices 113a-113n. However, any suitable structure may be employed. The distributed OS image test interface 105, in an embodiment, includes a login and password combination, or other authentication mechanisms, to identify a user. In an embodiment, the distributed OS image test interface 105 includes a graphical user interface. In the embodiment, the user enters the authentication information, and the distributed OS image test interface 105 presents one or more options to the user. For example, and without limitation, the distributed OS image test interface 105 may allow a user to select one or more images to be loaded on one or more of the devices 113a-113n, may allow the user to select one or more devices 113a-113n for testing, or may allow the user to start or stop a test sequence. The distributed OS image test interface 105 allows the user to specify one or more custom distributed OS images, where the OS images may include additional software or files, or the user may specify a set of software packages to be installed after imaging with a distributed OS image to bring the one or more devices 113a-113n into a desired testing state. In an embodiment, the distributed OS image test interface 105 may not include a graphical user interface, or may include a graphical user interface, but may also include another interface, such as an API or a command-line or text-based interface. The API may receive inputs from another system or program operating on the end user device 103. The distributed OS image test interface 105 receives the inputs from the user, and generates one or more commands. The commands are transmitted to the DOIM 109 via, for example and without limitation, a network 107 that connects the end user device 103 and the DOIM 109. The DOIM 109 receives and interprets the commands for further action. In an example, the distributed OS image test interface 105 includes a thin-client or web-based portal that a user accesses through an Internet browser. The distributed OS image test interface 105, in the example, supports real-time updates from the DOIM 109. The updates may show the real-time status or hardware configuration of one or more of the devices 113a-113n. In the example, the updates may also show a history of past images deployed to one or more of the devices 113a-113n. The user can utilize the distributed OS image test interface 105 to begin or schedule image deployment or re-deployment on any of the devices 113a-113n that are in communication with either the distributed OS image test interface 105 or the DOIM 109.

The network 107 may include one or more of: a local area network, a wide area network, a radio network such as a radio network using an IEEE 802.11x communications protocol, a cable network, a fiber network or other optical network, a token ring network, or any other kind of packet-switched network may be used. The network 107 may include the Internet, or may include any other type of public or private network 107. The use of the term "network" does not limit the network to a single style or type of network, or imply that one network is used. A combination of networks of any communications protocol or type may be used. For example, two or more packet-switched networks may be used, or a packet-switched network may be in communication with a radio network.

Devices 113a-113n are computer systems that may receive input from the DOIM 109 and/or the OS image database 111. In an embodiment, the devices 113a-113n are computer systems, such as, for example and without limitation, a desktop computer, a laptop computer, a tablet computer, or a handheld computer. The devices 113a-113n may, in an embodiment, be a smartphone. The devices 113a-113n may be different, or may be substantially similar. For example, the collection of devices 113a-113n may include more than one type of processor, or more than one type of memory, or more than one type of video card or other video processor. The devices 113a-113n also include an interface to one or more networks, such as a network interface card or other network interface, to allow the devices 113a-113n to transmit signals to and receive signals from one or more networks. Also, the DOIM 109, end user device 103, distributed OS image test interface 105, and the devices and images described herein may be implemented as software programs stored on a computer readable storage medium such as but not limited to CDROM, RAM, ROM, other forms of ROM, hard drives, distributed memory, etc., in combination with processors. As such, software programs may be stored on computer readable storage medium. The computer readable storage medium stores instructions executable by one or more processors that causes the one or more processors to perform operations described herein. In an embodiment, the devices 113a-113n associated with a DOIM 109 are substantially similar, with similar processors, or similar memory, or similar types of video cards or other video processors. In an embodiment, a device 113a is associated with a DOIM 109, but devices 113a-113n may be associated with multiple DOIM 109 systems, if multiple DOIM 109 systems are available. In an embodiment, if multiple DOIM 109 systems are available on a network 107, each of the devices 113a-113n may be associated with a single DOIM 109 system, although the devices 113a-113n may disconnect from one DOIM 109 system and connect to another DOIM 109 system.

The devices 113a-113n may include, but are not limited to, one or more processors and one or more storage devices 115a-115n. The term storage device, as used herein, may include, but is not limited to, devices that store and recall electronic data. Examples of storage devices include 115a-115n, but are not limited to, hard disk drives, flash memory, random-access memory, or other data storage and recall devices 113a-113n. The devices 113a-113n are in communication with the DOIM 109 and/or the OS image database 111 via one or more networks, and may receive commands and/or data, and may transmit commands and/or data, via the network 107.

The storage devices 115a-115n may be configurable, and the capacity on a storage device may be broken or divided into one or more partitions. A partition, as used herein, is a physical or logical separation of a storage device 115a into one or more sections. In a device 113a with two storage devices, a first partition 117 may be one storage device, and a second partition 119 may be the second storage device. In a device 113a with one storage device 115a, a first partition 117 may include one logical section of the storage device 115a, and a second partition 119 may include a second logical section of the storage device 115a. Partitions may be created, modified, or destroyed using software and/or hardware. While two partitions are shown in FIG. 1, more than two partitions may be present. The partitions may be used to store more operating systems, or may be used to store images or other files for the device 113a. In an embodiment, one partition is used, and one or more operating systems may be installed on the single partition, with software and/or hardware able to differentiate and boot an operating system from the single partition.

In the embodiment, one of the partitions may be designated as active. The other partitions, if more than one partition is present for a device 113a, may be designated as non-active or secondary. In the embodiment, the device 113a first searches the active partition of a storage device 115a for an operating system to load. If the device 113a finds a bootable operating system in the active partition, the device 113a loads that operating system into memory and executes it. The active partition may be set by software, and the device 113a may set a secondary partition to be active, and may set the currently active partition to be a secondary partition. If there are no active partitions, or if the active partition does not contain an operating system that may be used to boot the device 113a, the device 113a may search for other storage devices (not shown) associated with the device 113a, or other partitions, with operating systems that may be loaded. In an embodiment, the device 113a may include an environment to boot using a network interface and a network connection to one or more other devices 113a-113n or other systems. Other partitions may include other partitions of the storage device 115a, or other storage devices, such as, for example and without limitation, flash memory.

Figure 2:
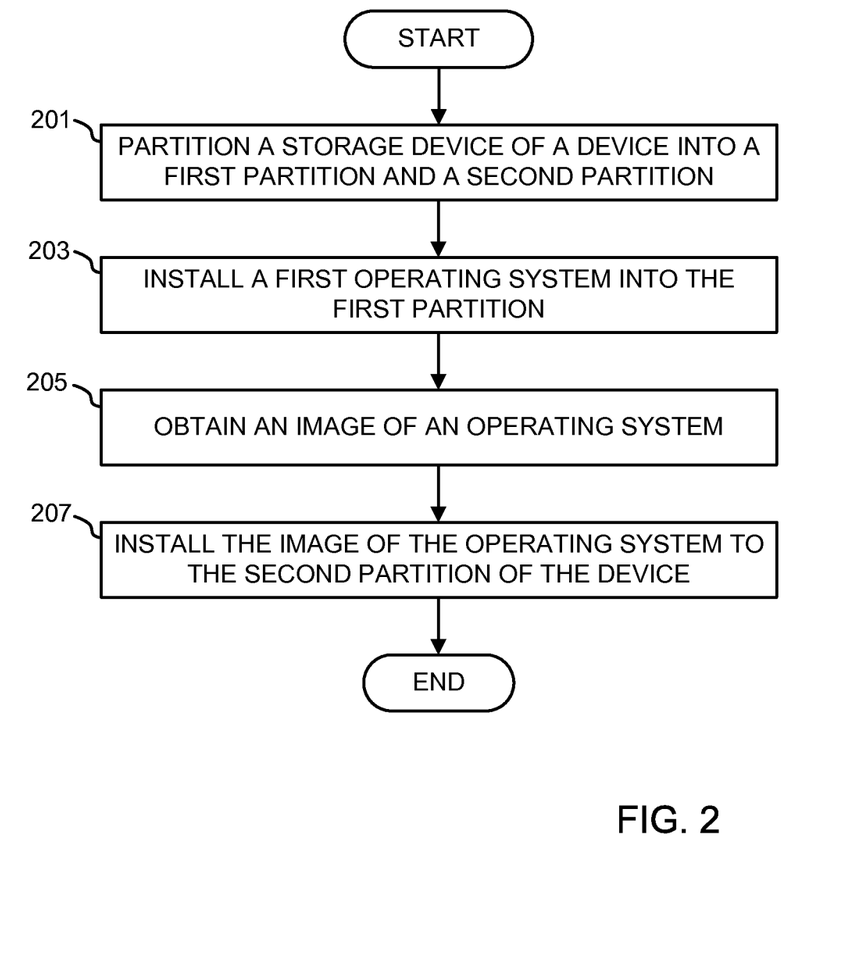
FIG. 2 is a flowchart illustrating an example of a method for initializing a device according on an embodiment of the present disclosure.

FIG. 2 is a flowchart illustrating an example of a method for initializing a device 113a according on an embodiment of the present disclosure. In block 201, the storage device 115a of a device 113a is partitioned into at least a first partition 117 and a second partition 119. The partitions may be physical and/or logical, and may include separate file systems. In block 203, a first operating system is installed onto the first partition 117. The first operating system, as described with reference to FIG. 3, includes input and output drivers, and network 107 connectivity to associate the device 113a with one or more networks, depending on the configuration and hardware operating with the device 113a. In block 205, an image of a second operating system is obtained. The image may be obtained from the DOIM 109, from the OS image database 111, or from one or more other systems, such as a second device 113b in communication with the device 113a. In block 207, the image is installed onto the second partition 119 of the storage device 115a.

Figure 3:
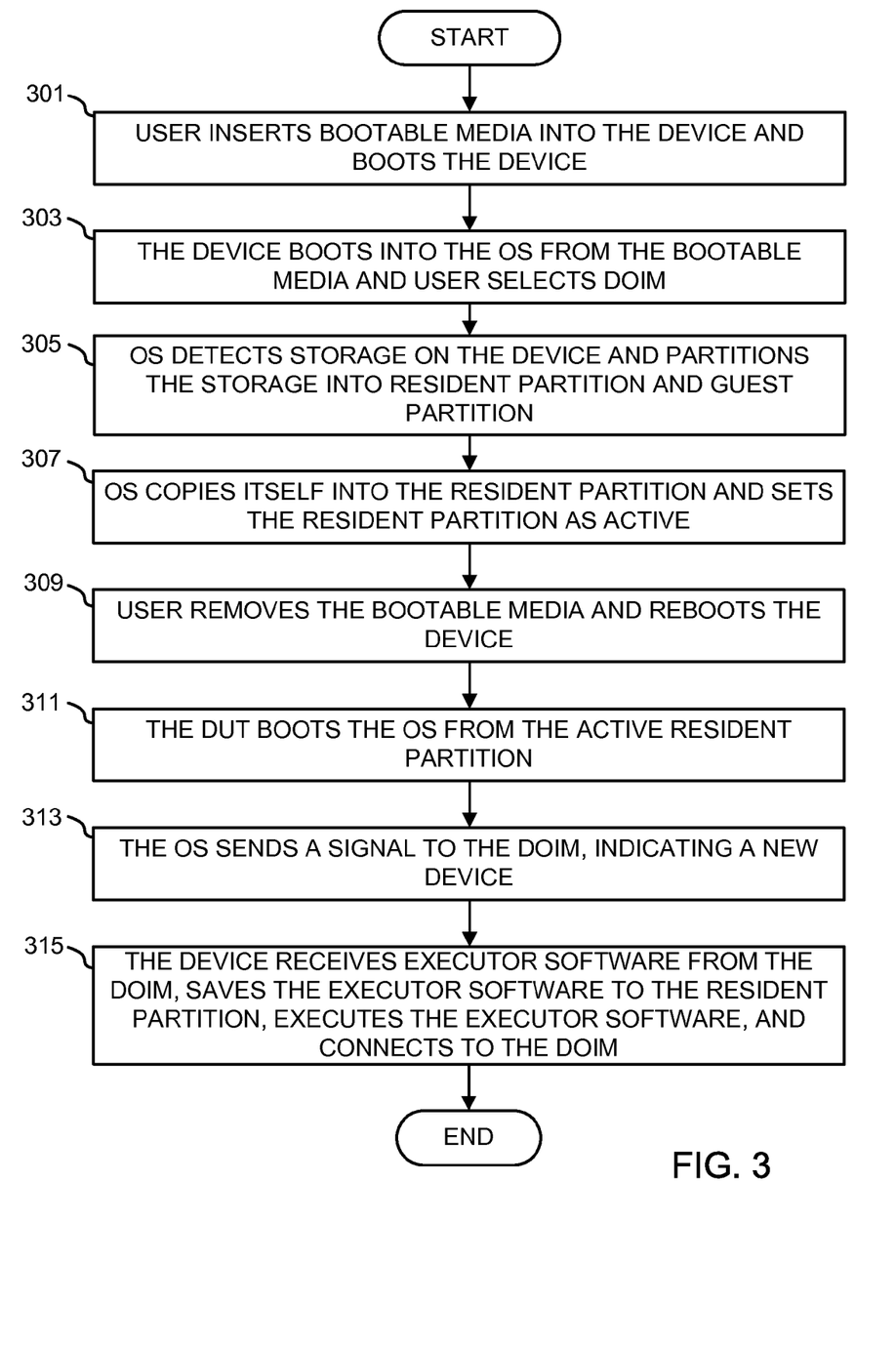
FIG. 3 is a flowchart illustrating the partitioning and installation aspects of the flowchart of FIG. 2.

FIG. 3 is a flowchart illustrating the partitioning and installation aspects of the flowchart of FIG. 2. FIG. 3 shows the initial registration of a device 113a, so that the device 113a may be recognized by the DOIM 109 and may receive images. Once a device 113a is registered, the user may not need to further physically interact with the device 113a.

In block 301, a user inserts a bootable media into the device 113a and boots the device 113a. The bootable media may include, but is not limited to, a CD-ROM, a USB drive, a portable hard drive, or a diskette. The bootable media includes an operating system. In an embodiment, the operating system has limited functionality, and may include basic read/write operations, display and input operation, and network 107 operation. In another embodiment, the operating system is fully functional. In another embodiment, the operating system includes one or more operating system images, which are transferred and/or loaded on the device 113a during installation. In an embodiment, the bootable media includes additional files, such as diagnostic utilities or other utilities to diagnose and repair problems with the device 113a and/or network 107. When booting, the device 113a recognizes the file system of the bootable media, and executes the operating system.

In block 303, the device 113a executes the operating system on the bootable media. The operating system, in the embodiment, includes network functionality, and the device 113a connects to the network 107. The user selects the DOIM 109 from an input screen. For example, and without limitation, the user may select a DOIM 109 by typing the address or other identifier of the DOIM 109 into the device 113a. In another embodiment, the available DOIM 109 systems are displayed on a screen or other input device 113a, and the user selects one or more of the DOIM 109 systems from the graphical user interface. In another embodiment, the bootable media includes one or more configuration files that automatically select a DOIM 109.

In block 305, the operating system detects storage on the device 113a, and partitions the storage into, in the embodiment, a first partition 117 and a second partition 119. In another embodiment, the operating system partitions the storage into more or fewer partitions.

In block 307, the operating system from the bootable media copies itself, referred to as the first operating system, into the first partition 117 of the storage device 115a. The operating system then sets the first partition 117 as the active partition. In an embodiment, the operating system copies another operating system resident on the bootable media to the first partition 117.

In block 309, the user optionally removes the bootable media from the device 113a, and reboots the device 113a. In an embodiment, the user may instead leave the bootable media with the device 113a, and may indicate that the bootable media no longer load, or does not load before the active partition of the storage device 115a, so that the device 113a will boot from the first operating system located on the storage device 115a instead of booting to the operating system on the bootable media.

In block 311, the device 113a reboots, and the device 113a loads the first operating system located in the first partition 117, which has been marked as the active partition.

In block 313, the operating system executing on the device 113a sends one or more signals to the DOIM 109, indicating that the device 113a is active and ready for use. In an embodiment, the DOIM 109 sends one or more signals to the device 113a, registering the device 113a with the DOIM 109. The signals may include, but are not limited to, a unique identifier that identifies the device 113a to the DOIM 109. In an embodiment, the device 113a may transmit additional information to the DOIM 109, such as specifications or hardware or software components installed on the device 113a.

In block 315, the DOIM 109 transmits executor software to the device 113a. The device 113a may install the executor software to the first partition 117 of the storage device 115a, and may create or modify one or more configuration files associated with the operating system on the first partition 117 to load the executor when the operating system is booted. The device 113a executes the executor software, and connects to the DOIM 109. The device 113a in this state is ready to receive one or more images from the DOIM 109, or from a system associated with the DOIM 109.

Figure 4:
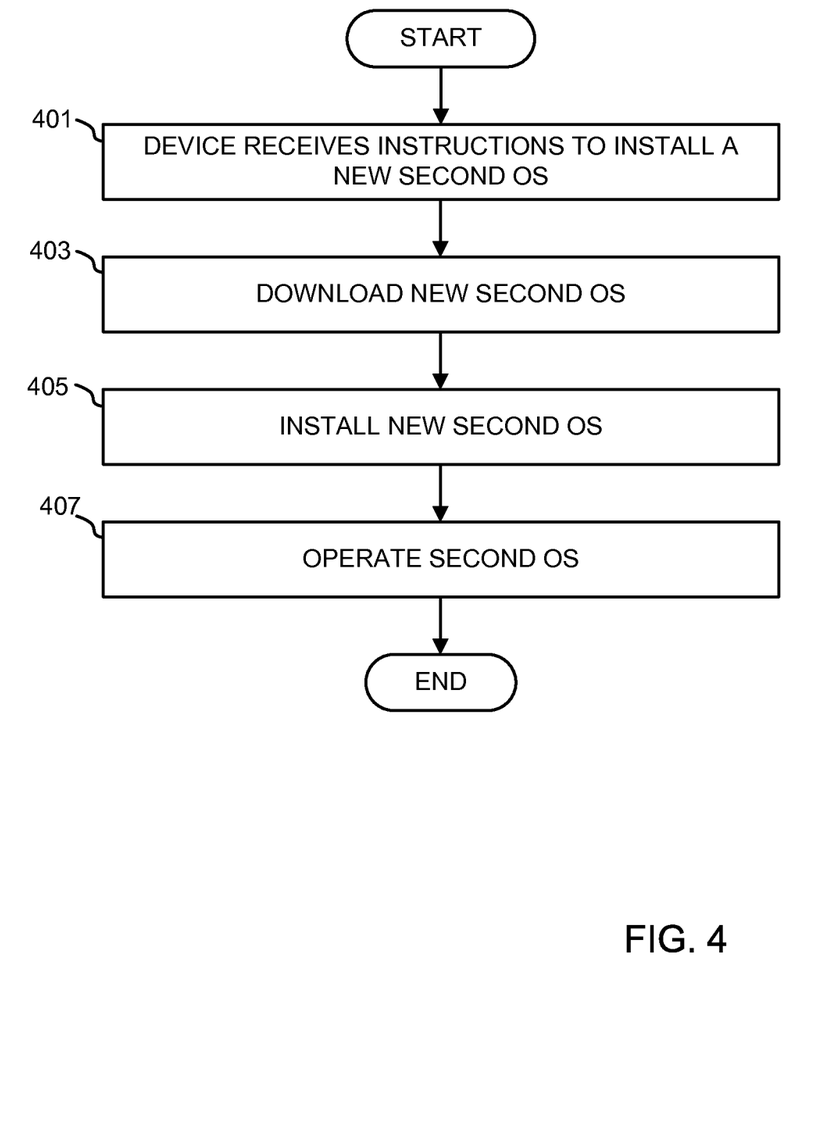
FIG. 4 is a flowchart illustrating an example of the initial installation of a guest operating system according to an embodiment of the present disclosure.

FIG. 4 is a flowchart illustrating an example of the initial installation of a guest operating system according to an embodiment of the present disclosure. In the example shown in FIG. 4, the device 113a includes a first operating system installed in a first partition 117, and a second operating system installed in a second partition 119. In block 401, the device 113a receives instructions to install a replacement operating system on the second partition 119. In block 403, the device 113a receives the image, or portions of the image, from the DOIM 109, from the OS image database 111, or from one or more other systems, such as a second device 113a in communication with the device 113a. In block 405, the image is installed onto the second partition 119 of the storage device 115a. In block 407, the device 113a is restarted, and the replacement operating system on the second partition 119 is operated on the device 113a.

Figure 5:
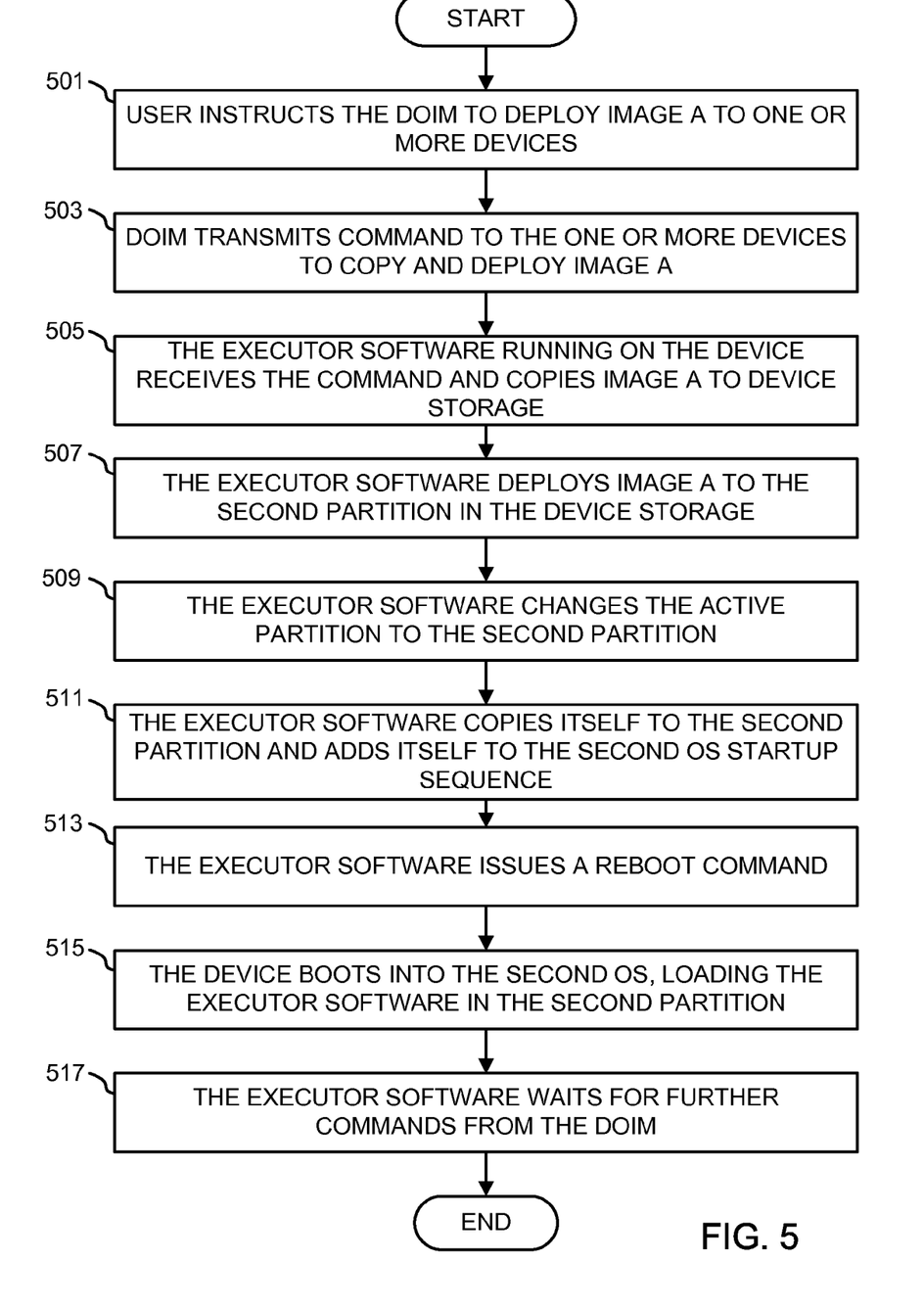
FIG. 5 is a flowchart illustrating the installation aspects of the flowchart of FIG. 4.

FIG. 5 is a flowchart illustrating the installation aspects of the flowchart of FIG. 4. The flowchart in FIG. 5 presumes that at least one device 113a is registered and is associated with the DOIM 109, that the DOIM 109 or another system includes an image that the user wishes to deploy, and that the device 113a is operating the first operating system and the executor associated with the first operating system. The storage device 115a associated with the device 113a, in the example, has a first partition 117 with the first operating system, and a second partition 119 that is substantially empty, empty, or that has files located in the second partition 119.

In block 501, the user, using the distributed OS image test interface 105 on an end user device 103, sends one or more signals to the DOIM 109 to transfer an image to one or more of the devices 113a-113n associated with the DOIM 109. In the example, the user wishes to send an image called "Image A" to the chosen devices 113a-113n. Image A may be a collection of operating system files, a single file that contains files necessary to operate and execute the operating system, and/or additional files, such as testing software or other configuration files. Additionally, the image may include an executor that is configured to operate with the operating system, and the operating system may be instructed via one or more configuration files or other configurations to execute the executor when the operating system is running on a device 113a. In another embodiment, the executor may not be distributed with the image, and may be already installed or located in storage associated with the device 113a, or may be downloaded from the DOIM 109 or other system located on the network 107.

In block 503, the DOIM 109 transmits one or more signals to the devices 113a-113n that the user has selected to receive Image A. The signals may include an activation command, a command to stop one or more programs that are currently operating, or a command to request Image A or to be ready to receive Image A. In an embodiment, the executor deletes one or more files, if files are present on the second partition 119.

In block 505, the executor software operating on the first operating system of the device 113a receives the command and requests Image A from the DOIM 109, the OS image database 111, or another system operating on the network 107, or makes one or more connections to other systems. The executor software prepares the storage device 115a associated with the device 113a to receive Image A. Image A may be stored on the first partition 117, or may be stored on the second partition 119. The device 113a receives Image A from a source, and stores Image A on the storage device 115a. In an embodiment, the device 113a stores Image A in another storage area, such as random-access memory or optical storage.

In block 507, the executor software deploys Image A to the second partition 119. The executor software may include additional functionality to decompress and/or decrypt Image A into one or more operating system files, or may call one or more other executable programs to decompress and/or decrypt Image A, if Image A is compressed and/or encrypted. If, for example, Image A is a container that includes the operating system files, then the executor and/or other executable files may include functionality to remove the operating system files from Image A.

In block 509, the executor software, or other software associated with the first operating system, makes the second partition 119 the active partition. This may be accomplished using hardware, software, or a combination of hardware and software. The second partition 119 is made active so that the device 113a will attempt to boot an operating system from the second partition 119 first, when the device 113a is started or restarted.

In block 511, the executor software copies itself, or a variant of itself, to the second partition 119, and adds instructions or configurations necessary so that the executor software on the second partition 119 is executed when the second operating system is started. In an embodiment, the executor software is operating system-independent, and so may be executed by any operating system. In an embodiment, the executor software is operating system-dependent, or at least partially operating-system dependent, so that the different versions of the executor software are installed depending on the operating system in the second partition 119. For example, a single executor software may be operable to execute on all or most versions of an operating system provided by a first company, but may not be able to execute on another operating system provided by a second company. In an embodiment, the executor software copies a version of itself from the first partition 117 to the second partition 119. In another embodiment, the executor software copies a version of the executor software compatible with the second operating system from another system, such as the DOIM 109 or the OS image database 111. In another embodiment, a version of the executor software that will operate with the second operating system is included in the image for the second operating system, and is copied to the second partition 119 when the image is installed to the second partition 119. In another embodiment, the executor software remains on the first partition 117, and the second operating system executes the executor software from the first partition 117. In another embodiment, the second operating system requests and/or receives a copy of the executor software from another system across a network 107 or other connection when the second operating system is executed by the device 113a.

In block 513, the executor software currently operating issues a reboot command to the device 113a. The reboot command may occur via hardware, software, or a combination of hardware and software. The reboot command restarts the device 113a. The device 113a searches the active partition on the device 113a for an operating system to load and execute.

In block 515, if the second operating system is operable and configured to interact with the device 113a, the second operating system loads and executes. From block 511, a copy of the executor software, and instructions for the second operating system to load and execute the executor software were included in the second operating system startup sequence, and so the second operating system loads the copy of the executor software loaded in the second partition 119.

In block 517, the executor software loaded and executed by the second operating system waits for commands from the DOIM 109. In an embodiment, the executor software transmits one or more signals to the DOIM 109 to indicate that the device 113a is operating with the second operating system and is available for further commands.

Figure 6:
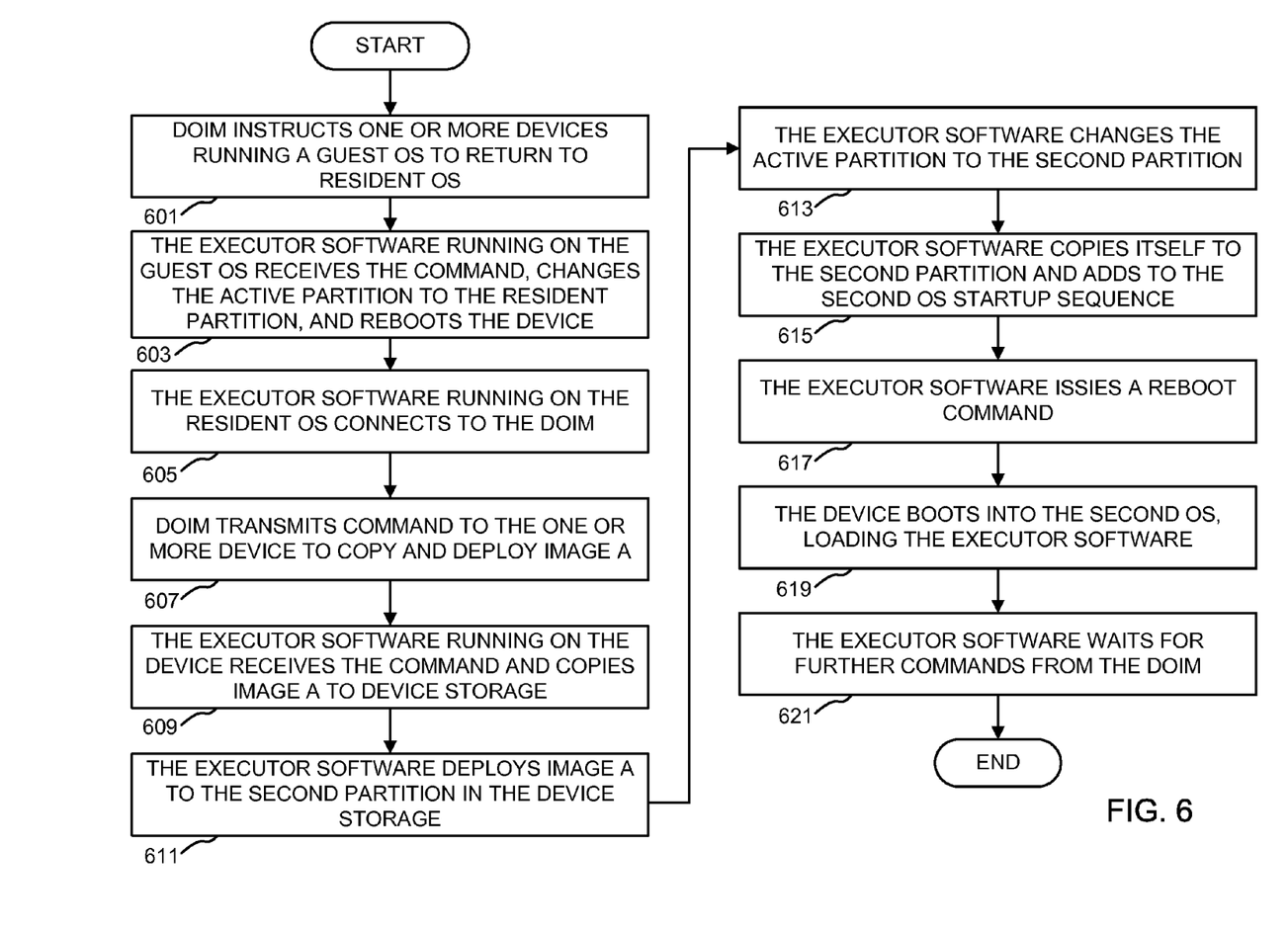
FIG. 6 is a flowchart illustrating the installation of a guest operating system on a device currently executing a guest operating system according to an embodiment of the present disclosure.

FIG. 6 is a flowchart illustrating the installation of a guest operating system on a device 113a currently executing a guest operating system according to an embodiment of the present disclosure. In the example shown in FIG. 6, the device 113a is operating an operating system from the second partition 119, a copy of the executor software is loaded and operating with the operating system from the second partition 119, and the first operating system and a copy of the executor software are located in the first partition 117, but are not loaded or operating. The second partition 119 is marked as active. In the example, the user wishes to deploy the operating system included in an image called Image A.

In block 601, the DOIM 109 instructs the device 113a to operate the first operating system on the first partition 117.

In block 603, the executor software operating with the operating system located on the second partition 119 receives the command from the DOIM 109, and sets the active partition of the storage device 115a to the first partition 117. The executor software then issues a command to reboot the device 113a. Setting the active partition, and issuing the reboot command, may occur via hardware, software, or a combination of hardware and software. The reboot command restarts the device 113a. The device 113a searches the active partition on the device 113a for an operating system to load and execute. Since the active partition was changed to the first partition 117, the device 113a first searches the first partition 117 for an operating system to load and execute. The first operating system is resident on the first partition 117, and the first operating system loads and executes on the device 113a. The first operating system includes instructions or is configured to operate the executor software associated with the first operating system. The device 113a restarts with the first operating system and the executor software loaded and executed.

In block 605, the executor software transmits one or more signals to the DOIM 109, indicating that the device 113a is operating the first operating system and is ready to receive further commands. In an embodiment, the DOIM 109 transmits commands to the device 113a to restart with the first operating system, and then, after a period of time, transmits commands to the device 113a to receive and/or install a new image. If the device 113a does not respond, or transmits an error message, the DOIM 109 may wait an additional period of time for the device 113a to complete a restart procedure.

In block 607, the device 113a is operating the first operating system and the executor software associated with the first operating system. The DOIM 109 transmits one or more commands to the device 113a to receive Image A. Blocks 607 to 621 are similar to blocks 503 to 517 from FIG. 5, and the method proceeds in a similar fashion.

Figure 7:
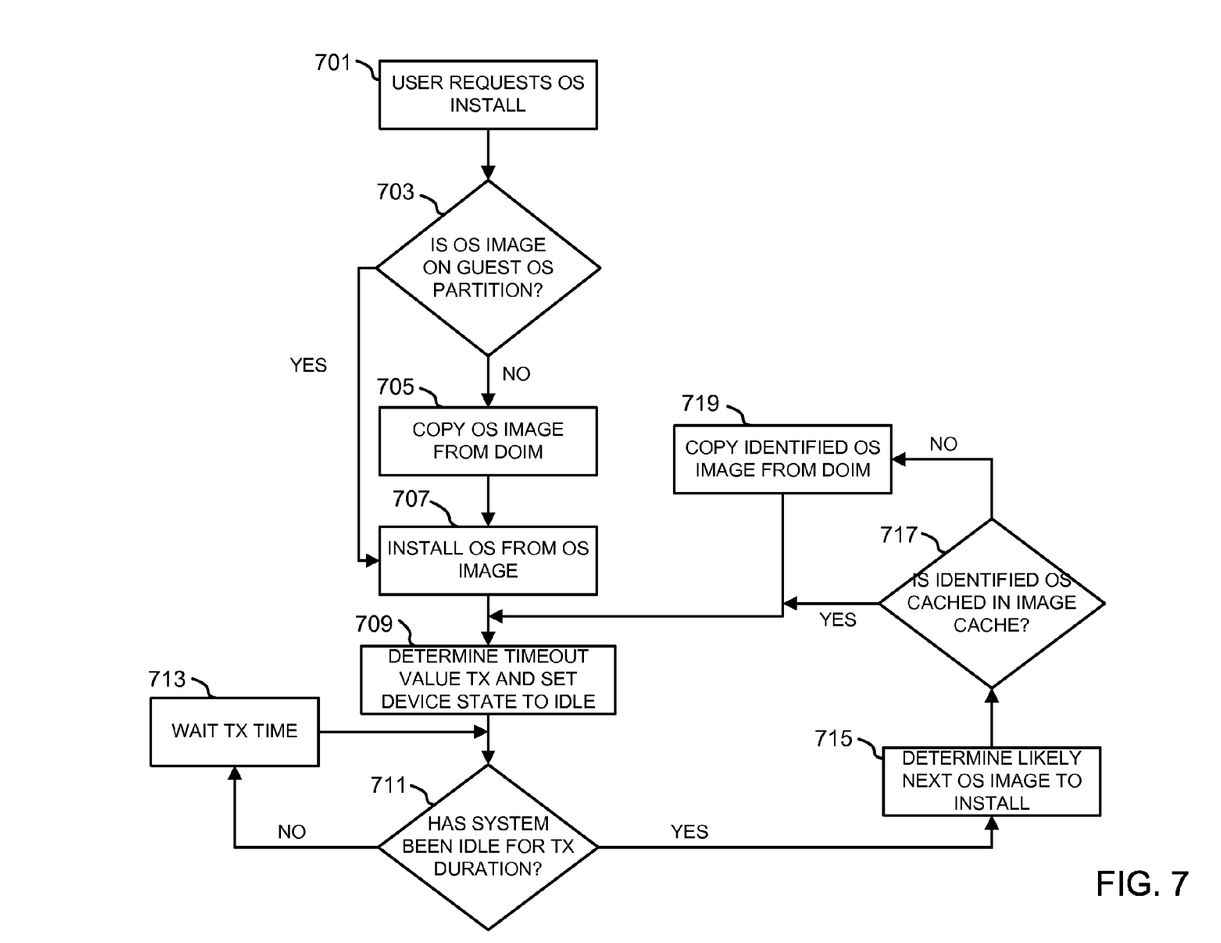
FIG. 7 is a flowchart illustrating operating system image caching according to an embodiment of the present disclosure.

FIG. 7 is a flowchart illustrating operating system image caching according to an embodiment of the present disclosure. To improve operation across geographically diverse regions, a caching mechanism caches operating system images locally on one or more of the partitions of a device 113a. When a new operating system deployment request is received by the executor currently running on the device 113a, instead of requesting and obtaining the correct operating system image, which may be large in size, from the OS image database 111, the executor first searches the local cache of operating system images for the requested operating system image. If the operating system image is not found in the local cache, the executor then requests the correct operating system image from the OS image database 111 or other system.

To ensure faster operating system deployments, the operating system image caching is made aware of the user's past actions, which allows the executor to predict and pre-fetch the an operating system image that is likely to be used next.

In the example, the device 113a has the first operating system installed and running on a first partition 117, and no operating systems in the second partition 119. The executor is operating with the first operating system, and is able to receive commands and/or data from the DOIM 109 or other systems. Additionally, the image cache of the device 113a does not include any operating systems in the example.

In block 701, the user requests that operating system "A" be deployed to the device 113a. The request may include a code, image file name, or other unique identifier for operating system A, to identify that operating system A is to be installed. The unique identifier identifies the image that the user selects from the other images available to the device 113a, either in the image cache or from another system on the network 107. The DOIM 109 transmits the code and/or the installation request to the device or devices 113a-113n that the user selects.

In block 703, the executor receives the code and/or request, and checks the image cache on the second partition 119 for operating system A. The executor may, for example and without limitation, check the image cache for the particular file name associated with the operating system image that the user requested. The executor may also search for an image fingerprint or other identifying code or unique identifier to correctly identify the operating system that the user selected. If the executor finds the operating system image that the user selected, the method may move to block 707.

In block 705, if the executor does not locate the correct operating system image in the image cache, the executor requests a copy of the image. The image may be provided by the DOIM 109 that the device 113a is associated with, by the OS image database 111 or associated system, or by one or more other devices 113a-113n in communication with the requesting device 113a. The device 113a obtains the correct operating system image from one or more of the sources, and copies or saves it to the second partition 119.

In block 707, the executor installs the operating system from the operating system image obtained in block 705 or from the operating system image already stored locally on the device 113a in the image cache. The executor may decompress and/or decrypt one or more operating system files and/or one or more additional files from the operating system image.

In block 709, once the operating system install has been completed, the executor sets the system state to idle. If the device 113a receives commands to operate a test routine or to commence operation, or if a user uses the device 113a, the executor may set the system state to "in use." When the test routine is compete, or when the user is no longer using the device 113a, the executor may reset the system state to idle. The executor sets a timeout value Tx. The timeout value may be set by a user or may be set by hardware and/or software. The timeout value may be the same across all devices 113a-113n, or may be set on a device-by-device basis.

In block 711, if the device 113a has been idle for the timeout value, the executor notifies the DOIM 109 that the idle time has met or exceeded the timeout value. If the device 113a has not been idle for the timeout value, the executor continues to wait for the system state to be set to "in use" or for the timeout value to be reached.

In block 715, the DOIM 109 examines the past OS deployment records of the user who initiated the deployment for the operating system image request in block 701, and using one or more algorithms, determines the next likely operating system image to be requested by the user. The DOIM 109 or other system transmits the code or other unique identifier identifying the next likely operating system image to the device 113a. In the embodiment, the algorithm includes three weighted inputs. The three weighted inputs are the recent history of the user, for example what operating system images the user recently requested to be installed, and the frequency that the user requested the installations; the recent history of the device 113a, for example a frequency of operating system images that have been installed on the requesting device 113a, which may be a time frame set by the system as, for example, a week or a month; and the recent history of the devices 113a-113n in a certain geographic area, for example the history of the devices 113a-113n in a particular building, on a particular network 107 or sub-network 107, or that are identified with a particular area. In the embodiment, the weights may begin as 0.5 for the recent history of the user, 0.3 for the recent history of the device 113a, and 0.2 for the recent history of the geographic area.

In block 717, the executor operating on the device 113a receives the code or other unique identifier, and compares the code to the image or images stored locally in the image cache. If the executor finds the operating system image identified by the code transmitted from the DOIM 109 in the image cache, the executor does not request a copy of the identified operating system image, and returns to block 709, to wait for another timeout value Tx time.

In block 719, if the executor does not find the operating system image identified by the code transmitted from the DOIM 109 in the image cache, the executor requests a copy of the operating system image from the DOIM 109, the OS image database 111, or another system. The executor receives the operating system image and stores the operating system image in the image cache on the device 113a, and returns to block 709, to wait for another timeout value Tx time. The device 113a is kept idle for a dynamically determined timeout value (greater than the previous timeout value), and the process is repeated again.

If the user selects the operating system image that the DOIM 109 has selected, the weights for the inputs that indicated that operating system image are increased, and the weights that did not indicate the correct operating system image are decreased. The increase and decrease may be by a set amount, or may be determined dynamically by, for example, the frequency that the input has historically been correct in choosing the next operating system image to be used. If the user does not select the operating system image that the DOIM 109 selected, the weights are also changed to favor the inputs, if any, that successfully predicted the operating system image. If no inputs predicted the operating system image that the user selected, the weights may not change.

The operating system image caching feature ensures that the devices 113a-113n utilize idle network 107 capacity and lowers the load on the network 107 when the user operates the next likely operating system image. Since the process repeats itself with a dynamically determined timeout value for each waiting cycle, the method ensures that the devices 113a-113n are continuously updated to the best possible estimate of the next deployment package that the DOIM 109 determines by learning usage patterns in the time elapsed since the last user action.

While the exemplary embodiment of FIG. 7 shows the caching of one operating system image, additional operating system images may also be cached. The DOIM 109 and/or the device 113a may repeat the method to copy, for example and without limitation, the second and third most likely operating system images to be chosen by the user. The DOIM 109 and/or the device 113a may limit the number of operating system images in the device's image cache because of storage requirements and/or available network 107 bandwidth.

Figure 8:
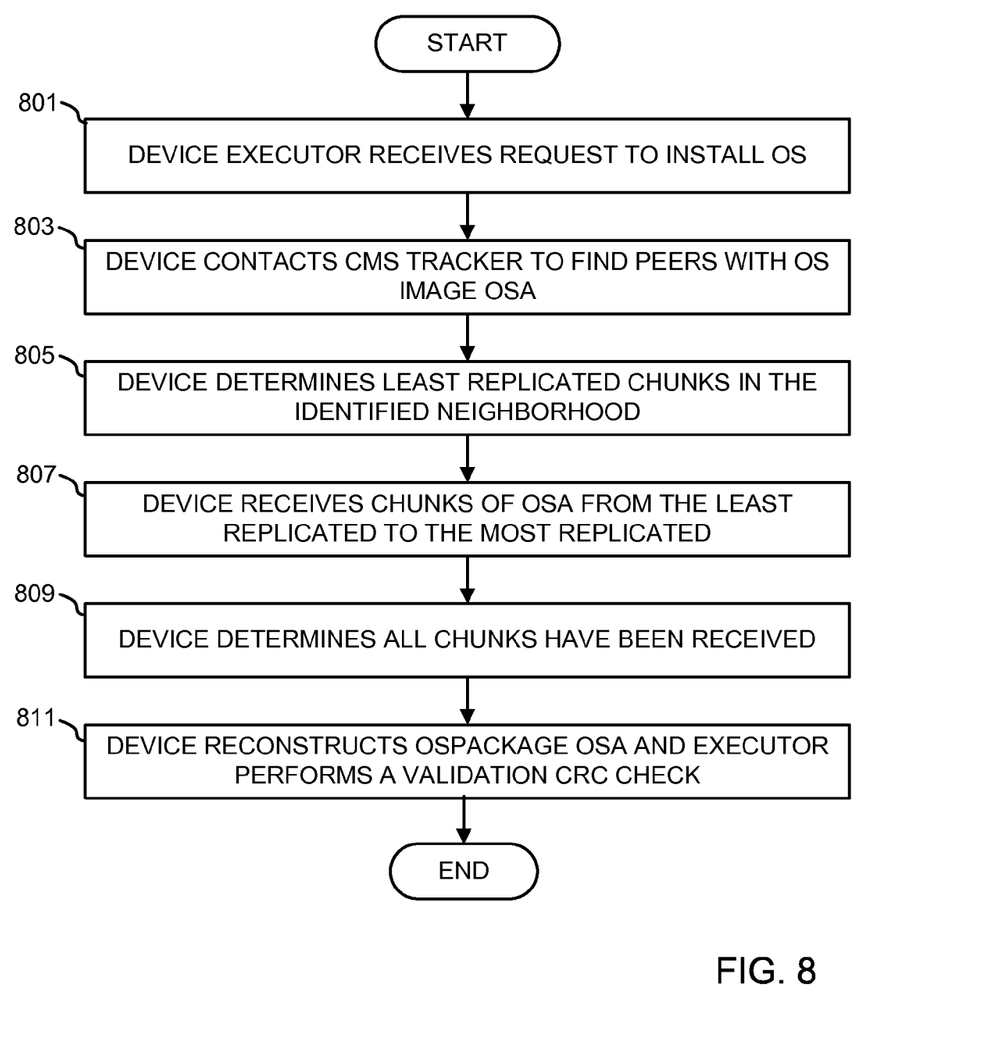
FIG. 8 is a flowchart illustrating distributed operating system image peering according to an embodiment of the present disclosure.

Many of the devices 113a-113n on a network 107 are frequently idle. The operating system image caching feature lines up operating system images for each device 113a to pre-fetch, a significant portion of the network 107 bandwidth between the DOIM 109 and the devices 113a-113n is dedicated to the pre-fetching operations, resulting in lower bandwidth availability for actual testing. To circumvent this problem, a peer-to-peer based network 107 between the devices 113a-113n may be utilized to facilitate faster operating system image gathering and lower network 107 loads. FIG. 8 is a flowchart illustrating distributed operating system image peering according to an embodiment of the present disclosure.

In block 801, the executor currently operating on the device 113a receives a request from the associated DOIM 109 to install a new operating system. The request may include a code or other unique identifier associated with the operating system image to install.

In an embodiment, the image may be broken into one or more portions, or "chunks." The image may be broken in a specific manner; for example, the image may be broken into a set number of equal portions, or may be broken into a variable number of portions with a set file size. As an example, if an image ImageA was 10 gigabytes, and an image ImageB was 5 gigabytes, Image A may be broken into five portions of 2 gigabytes each, and ImageB may be broken into five portions of 1 gigabyte each. Or ImageA may be broken into 10 portions of 1 gigabyte each, and ImageB may be broken into five portions of 1 gigabyte each. The mechanism of breaking an image into smaller chunks is consistent across the images, so that chunks may be received from different devices 113a-113n and assembled into an image. The chunks may be assigned unique identifiers, so that each chunk is separately identifiable, and chunks may be requested or transmitted between devices 113a-113n and/or the DOIM 109. The unique identifier may, for example, include all or a portion of the unique identifier for the image, and a second unique identifier for the chunk within the image. Splitting the image may be directed by the DOIM 109, or may be directed by software and/or hardware running on the devices 113a-113n.

In block 803, the device 113a contacts the associated DOIM 109 tracker with the unique identifier associated with the operating system image to install. The DOIM 109 functions as a tracker of the images and the chunks, and is the repository of information about each devices 113a-113n pre-cached and in-transfer images and chunks. The DOIM 109 tracker transmits information to the device 113a regarding the devices 113a-113n containing all or a portion of the operating system image that the device 113a has requested. In an embodiment, the DOIM 109 tracker transmits information regarding all devices 113a-113n on the network 107 that have the operating system image. In another embodiment, the DOIM 109 tracker transmits information regarding devices 113a-113n with the operating system image that are geographically close to the requesting device 113a, or that have or are estimated to have a lower latency to the requesting device 113a. In an embodiment, the DOIM 109 tracker is separate from the DOIM 109 associated with the device 113a. In another embodiment, the DOIM 109 tracker and the DOIM 109 associated with the device 113a are located on the same system, or are a part of the same system or group of systems, so that blocks 801 and 803 occur during the same communication session between the device 113a and the DOIM 109. The DOIM 109 tracker may include one or more tables to track the chunks that are available for the devices 113a-113n. In an embodiment, the devices 113a-113n, when in use, may transmit information to the DOIM 109 so that the DOIM 109 does not indicate that devices 113a-113n in use are available to transmit chunks.

In block 805, the device 113a determines, based on the information received from the DOIM 109, the least replicated chunks from the information transmitted from the DOIM 109. The device 113a sorts the information transmitted from the DOIM 109 to determine the least replicated chunks. In an embodiment, the device 113a also sorts the information to determine the device 113a with the least replicated chunk that is likely to transmit the chunk in the shortest amount of time. The device 113a requests the least replicated chunk from the chosen device 113a. In an embodiment, the request includes the code or other unique identifier of the specific chunk. If the image is not available on devices 113a-113n that are available to the device 113a, or if one or more chunks are not available from other devices 113a-113n, the DOIM 109 and/or the OS image database 111 may transmit the image to the device 113a, or may transmit one or more chunks to the device 113a.

In block 807, block 805 repeats from the least replicated chunk to the most replicated chunk, until the device 113a has received each of the chunks for the image. In an embodiment, the device 113a requests a chunk from a device 113a, receives the chunk, and requests another chunk from a device 113a, which may be the same device 113a or a different device 113a. In another embodiment, the device 113a requests chunks from two or more devices 113a-113n simultaneously.

In the embodiment, the device 113a may calculate the devices 113a-113n' available bandwidth and the bandwidth of the other devices 113a-113n, and may limit the number of chunks that are requested simultaneously. The device 113a may request all chunks simultaneously from different devices 113a-113n, or may favor a device 113a with a low latency or a high bandwidth with simultaneous or serial requests. If, for example, a device 113a requested a chunk from one device 113b, and the chunk was partially transmitted but interrupted, the device 113a may request re-transmission of the chunk from another device 113c, or from the same device 113b after a delay. When the device 113a receives a chunk, the device 113a may transmit the information to the DOIM 109, so that the DOIM 109 may know that the device 113a has the particular chunk, and may provide the information to other devices 113a-113n that request the chunk.

In an embodiment, each of the chunks is also accompanied by a check value calculation. The check value is the result of a mathematical operation performed on a copy of the chunk that is known or likely to be free from error. The operation results in a number or other result that may be transmitted between devices 113a-113n and/or the DOIM 109. When a device 113a has received a chunk, the device 113a may re-execute the mathematical operation and receive a second result. The second result may be compared to the result transmitted with the chunk, or received from the DOIM 109. If the second result is identical to the result transmitted with the chunk, or received from the DOIM 109, the device 113a has confidence that the chunk received will interact with other, similarly validated chunks to yield an image that is free from transmission error. If the second result does not match the result transmitted with the chunk, or received from the DOIM 109, the device 113a may not have confidence that the chunk was transmitted without error. The device 113a may attempt to use error correction to correct the error with the chunk, or may request that the device 113b, or another device 113c, retransmit the chunk. In an embodiment, the device 113a sends the second result to the device 113b that transmitted the chunk, and the device 113b that transmitted the chunk may compare that received result with its own copy of the chunk, to verify that it has not been corrupted. In an embodiment, the check value is created for the entire image, and the device 113a assembles the image from the chunks before performing the mathematical function to determine the calculated check value.

In block 809, the device 113a may receive each of the chunks used to create the image. The information on the number of chunks may be coded into the unique identifier for the chunks, or may be provided by the DOIM 109 when the devices 113a-113n request the image. The device 113a assembles the image from the collection of chunks the device 113a has received from other devices 113a-113n and/or the DOIM 109.

In block 811, the device 113a may receive each of the chunks used to create the image. The device 113a may use check values to determine that the chunks are likely not corrupted, or may use a check value on the final assembled image.

Figure 9:
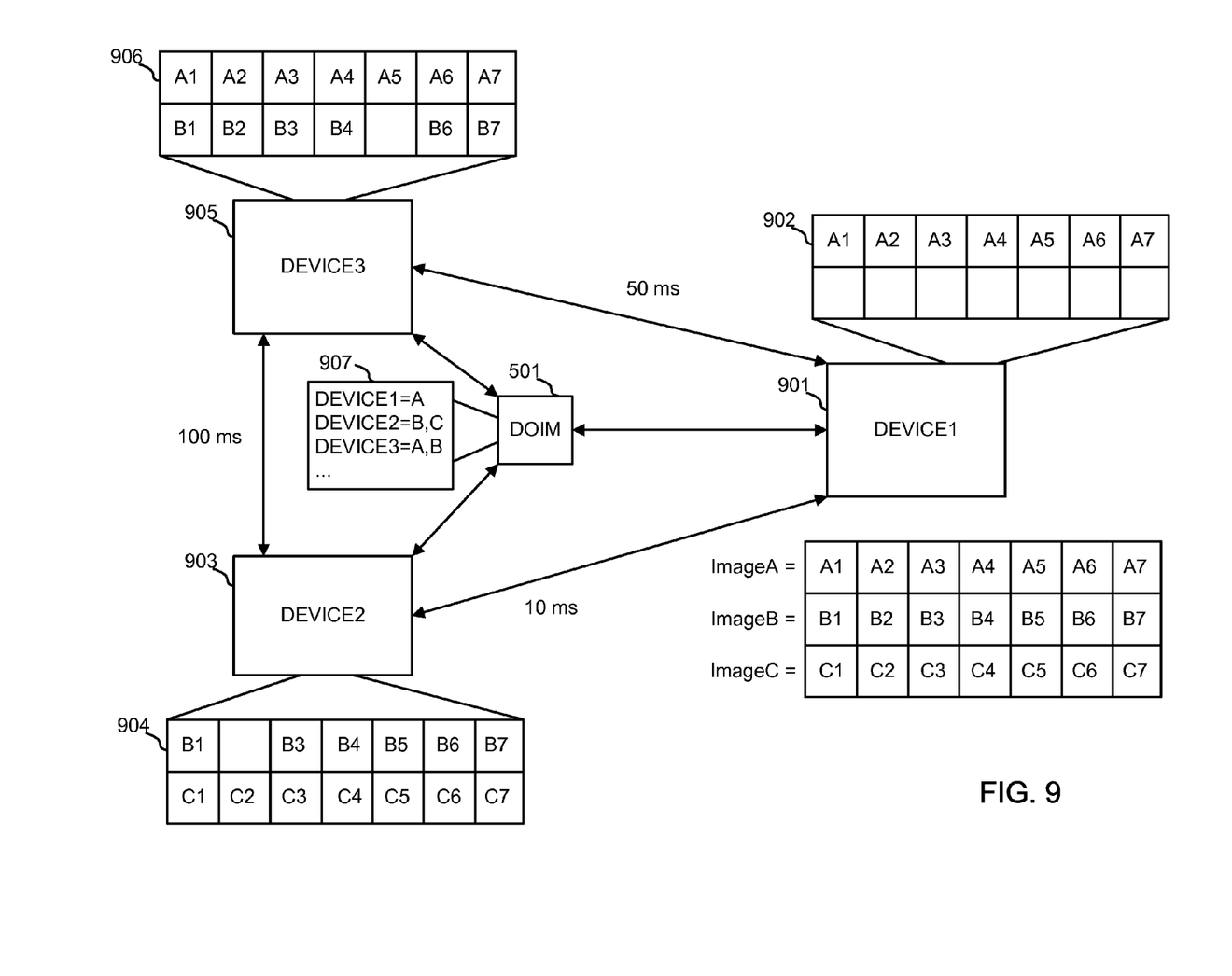
FIG. 9 is a block diagram illustrating the peering and distributed operating system image installation according to an embodiment of the present disclosure.

FIG. 9 is a block diagram illustrating the peering and distributed operating system image installation according to an embodiment of the present disclosure. Device1 901, Device2 903, and Device3 905 are associated with the DOIM 501, and each include storage areas 902, 904, and 906, respectively. The DOIM 501 includes a table 907 listing the chunks and/or images associated with each of the devices. Storage area 902 includes each of the chunks A1-A7 for imageA. Storage area 904 includes each of the chunks B1-B7 for imageB, and each of the chunks C1-C7 for imageC. Storage area 906 includes each of the chunks A1-A7 for imageA, and each of the chunks B1-B7 for imageB. In the example, Device 1 901 requests imageB from the DOIM 501, or the DOIM 501 instructs Device 1 901 to install imageB. Device 1 901 requests the DOIM 501 to provide each of the devices geographically near Device 1 901 or with a low transmission latency to Device 1 901, that have imageB. The DOIM 501 transmits the table 907 to Device 1 901, or the relevant portions of the table to Device 1 901, which shows that Device 2 903 and Device 3 905 each have copies of some of the chunks of imageB. Device 1 901 starts with the least replicated chunks; in this example, chunk B2 is only found on Device 3 905, and chunk B5 is only found on Device 2 903. Device 1 901 requests chunk B2 from Device 3 905, and chunk B5 from Device 2 903. Each of the other chunks B1, B3, B4, B6, and B7 are found equally throughout the devices, so Device 1 901 may request chunks from Device 2 903, as it has a lower latency time. Device 1 901 may open simultaneous connections to Device 2 903 to receive the remainder of the chunks, or Device 1 901 may open connections to Device 2 903 and Device 3 905 if bandwidth limitations or other operations limit the speed that Device 1 901 may receive chunks from Device 2 903.

Among other advantages, the present disclosure may allow the distribution of operating system images and/or other electronic files to computer systems that are in communication with a network. The operating system images may be transmitted to one or more devices, and the one or more devices may use the operating system images to recreate an installation of an operating system on a device. The operating system may be transmitted and/or installed on the device without direction interaction by a user. Accordingly, the proposed techniques can improve user control of devices by providing a more intuitive and user-friendly way to deploy and install operating system images to a plurality of devices. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for distributing an operating system, comprising:
    partitioning a storage device of a device into a first partition and a second partition;
    installing a first operating system into the first partition of the storage device, wherein the device transmits registration information to a central repository of images connected to the device with one or more networks after the first operating system is installed onto the first partition to obtain an image of a second operating system;
    obtaining the image of the second operating system, the image including at least a second operating system preconfigured for operation with the device; and
    installing, using the first operating system, the image of the second operating system to the second partition of the storage device.

2. The method of claim 1, further comprising designating the second partition as the active partition, and rebooting the device to execute one or more files from the second operating system in the second partition.

3. The method of claim 1, wherein the image is transmitted to the device from the central repository of images connected to the device with one or more networks.

4. The method of claim 1, wherein the image is transmitted to the device from a second device.

5. The method of claim 1, wherein the image is divided into portions, and at least a first portion is received by the device from a second device, and at least a second portion is received by the device from a third device.

6. The method of claim 5, wherein the portions of the image are verified and the verified portions are combined into an image.

7. The method of claim 5, wherein the device first receives the portions that are the least replicated across one or more additional devices.

8. The method of claim 1, wherein the device receives one or more additional images, and stores the one or more additional images.

9. The method of claim 8, wherein an algorithm is used to predict the future use of the one or more additional images, and the one or more additional images are received by the device based at least on the algorithm and the remaining storage capacity of the storage device.

10. The method of claim 9, wherein the algorithm includes weighted inputs for at least a recent history of a user, a recent history of the device, and a recent history of additional devices in a certain geographic area surrounding the device.

11. The method of claim 8, further comprising receiving instructions by the device to install an image on a partition wherein the instructions include information of the image to install on the partition, and wherein the device installs one or more of the additional images if the image and the instruction information match, and receives the image if none of the one or more additional images match the instruction information.

12. The method of claim 1, further comprising testing the device using the installed image of the second operating system in the second partition of the storage device.

13. A method of data distribution, comprising:
receiving instructions from an end user device, the instructions identifying at least one device and at least one image;
transmitting at least one of the at least one image or information regarding the location of at least one of the at least one image to the at least one device to receive the at least one image;
operating the at least one device, the at least one device including at least a storage device capable of being partitioned, the storage device including a second partition with a second operating system, and a first partition with a first operating system;
transmitting registration information to a central repository of images connected to the at least one device with one or more networks to receive instructions to operate the first operating system;
receiving instructions by the at least one device to operate the first operating system from the central repository of images connected to the at least one device with the one or more networks;
changing an active partition to the first partition, and rebooting the at least one device to operate with the first operating system in response to receiving instructions to operate the first operating system from the central repository of images;
receiving instructions from the central repository of images to receive a third operating system;
receiving the image, the image including at least one or more files to execute the third operating system;
removing the second operating system from the second partition:
installing the third operating system on the second partition and changing the active partition to the second partition, and rebooting the at least one device to operate with the third operating system; and
receiving an indication from the at least one device that the at least one image is operational.

14. The method of claim 13, further comprising transmitting data to the at least one device to begin a test sequence.

15. The method of claim 13, wherein the image is transmitted to the at least one device from a second device, wherein the at least one device and the second device are each associated with a central repository of images connected to the at least one device and the second device with one or more networks.

16. The method of claim 13, wherein the image is divided into portions, and at least a first portion is transmitted to the at least one device from a second device, and at least a second portion is transmitted to the at least one device from a third device.

17. The method of claim 16, wherein the portions of the image are verified and the verified portions are combined into an image.

18. The method of claim 16, wherein the at least one device first receives the portions that are the least replicated across one or more additional devices.

19. The method of claim 13, wherein the at least one device receives one or more additional images, and stores the one or more additional images.

20. The method of claim 19, wherein an algorithm is used to predict the future use of the one or more additional images, and the one or more additional images are received by the at least one device based at least on the algorithm and the remaining storage capacity of the storage device.

21. The method of claim 20, wherein the algorithm includes weighted inputs for at least a recent history of a user, a recent history of the device, and a recent history of additional devices in a certain geographic area surrounding the at least one device.

22. A method of data distribution, comprising:
operating a device, the device including at least a storage device capable of being partitioned, the storage device including a second partition with a second operating system, and a first partition with a first operating system;
transmitting registration information to a central repository of images connected to the device with one or more networks to receive instructions to operate the first operating system;
receiving instructions by the device to operate the first operating system from the central repository of images connected to the device with the one or more networks;
changing an active partition to the first partition, and rebooting the device to operate with the first operating system, in response to receiving instructions to operate the first operating system from the central repository of images;
receiving instructions from the central repository of images to receive a third operating system;
receiving an image, the image including at least one or more files to execute the third operating system;
removing the second operating system from the second partition; and
installing the third operating system on the second partition and changing the active partition to the second partition, and rebooting the device to operate with the third operating system.

23. The method of claim 22, further comprising a first executor software on the first partition and operable by the first operating system, a second executor software on the second partition and operable by the second operating system.

24. The method of claim 23, wherein the second executor software receives the instructions to operate the first operating system, and the first executor software receives the instructions to receive the third operating system.

25. The method of claim 24, further comprising a third executor software executable by the third operating system.

26. An apparatus for distributing an operating system, comprising:
   logic comprising a plurality of processors and operable to:
      partition a storage device of a device into a first partition and a second partition;
      install a first operating system into the first partition of the storage device, wherein the device transmits registration information to a central repository of images connected to the device with one or more networks after the first operating system is installed onto the first partition to obtain an image of a second operating system;
      obtain the image of the second operating system, the image including at least a second operating system pre-configured for operation with the device; and
      install, using the first operating system, the image of the second operating system to the second partition of the storage device.

27. The apparatus of claim 26, wherein the logic is comprised of one or more processors that are operable to execute instructions.

28. A non-transitory computer-readable storage medium comprising executable instructions that when executed by one or more processors causes the one or more processors to:
   partition a storage device of a device into a first partition and a second partition;
   install a first operating system into the first partition of the storage device, wherein the device transmits registration information to a central repository of images connected to the device with one or more networks after the first operating system is installed onto the first partition to obtain an image of a second operating system;
   obtain the image of the second operating system, the image including at least a second operating system pre-configured for operation with the device; and
   install, using the first operating system, the image of the second operating system to the second partition of the storage device.

* * * * *